US011353392B2

(12) United States Patent
Berg et al.

(10) Patent No.: US 11,353,392 B2
(45) Date of Patent: Jun. 7, 2022

(54) CONTACT-FREE HOLOGRAPHIC IMAGING OF AEROSOL PARTICLES FROM MOBILE PLATFORMS

(71) Applicant: U.S. Army Combat Capabilities Development Command, Army Research Laboratory, Adelphi, MD (US)

(72) Inventors: Matthew J. Berg, Manhattan, KS (US); Osku P. Kemppinen, Hyattsville, MD (US); Gorden W. Videen, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1 day.

(21) Appl. No.: 17/027,131

(22) Filed: Sep. 21, 2020

(65) Prior Publication Data
US 2022/0091019 A1 Mar. 24, 2022

(51) Int. Cl.
*G01N 15/14* (2006.01)
*G01N 15/00* (2006.01)
*G01N 15/02* (2006.01)

(52) U.S. Cl.
CPC ..... *G01N 15/1463* (2013.01); *G01N 15/0205* (2013.01); *G01N 2015/0065* (2013.01); *G01N 2015/0233* (2013.01)

(58) Field of Classification Search
CPC . G01N 15/0227; G01N 15/0205; G01B 9/021
See application file for complete search history.

(56) References Cited

U.S. PATENT DOCUMENTS

| 3,520,610 A | * | 7/1970 | Bjr | G01N 15/0227 |
| | | | | 359/33 |
| 3,993,399 A | * | 11/1976 | Jacoby | G03H 1/02 |
| | | | | 359/30 |
| 4,444,500 A | * | 4/1984 | Flinsenberg | G01N 15/0205 |
| | | | | 356/336 |
| 4,536,883 A | * | 8/1985 | Chapline, Jr. | G03H 5/00 |
| | | | | 378/36 |
| 4,810,094 A | * | 3/1989 | Witherow | G01N 21/453 |
| | | | | 356/457 |

(Continued)

OTHER PUBLICATIONS

U.S. Appl. No. 16/814,061, filed Mar. 10, 2020.

*Primary Examiner* — Shawn Decenzo
*Assistant Examiner* — Jarreas C Underwood
(74) *Attorney, Agent, or Firm* — Eric B. Compton

(57) ABSTRACT

A device includes a filter that enhances a beam profile of a received pulsed laser; a first optical element to direct the pulsed laser as a reference wave towards an optical sensor; an open cavity positioned between the first optical element and the optical sensor. The open cavity receives an aerosol particle, which enters the open cavity from any direction. The reference wave illuminates the aerosol particle. An illuminated particle generates and directs an object wave towards the optical sensor. A pixel array is connected to the optical sensor. The pixel array receives the reference wave and the object wave. The optical sensor creates a contrast hologram comprising an interference pattern of the illuminated particle. A processor creates an image of the illuminated particle based on the contrast hologram.

22 Claims, 11 Drawing Sheets

(56) References Cited

U.S. PATENT DOCUMENTS

| | | | | |
|---|---|---|---|---|
| 5,299,035 A | * | 3/1994 | Leith | G03H 1/041 |
| | | | | 359/9 |
| 5,351,118 A | * | 9/1994 | Spinell | G01N 15/10 |
| | | | | 250/283 |
| 5,548,419 A | * | 8/1996 | Adrian | G03H 1/28 |
| | | | | 359/24 |
| 8,830,476 B2 | | 9/2014 | Berg et al. | |
| 9,222,874 B2 | | 12/2015 | Hill et al. | |
| 9,443,631 B1 | | 9/2016 | Pan et al. | |
| 9,448,155 B2 | | 9/2016 | Pan | |
| 2002/0126333 A1 | * | 9/2002 | Hosono | G03H 1/04 |
| | | | | 359/35 |
| 2007/0258118 A1 | * | 11/2007 | Toishi | G11B 7/128 |
| 2013/0242301 A1 | * | 9/2013 | Berg | G01N 15/1475 |
| | | | | 356/336 |
| 2016/0231225 A1 | * | 8/2016 | Hayden | G01B 11/0608 |
| 2017/0219999 A1 | * | 8/2017 | Serabyn | G02B 6/0008 |
| 2021/0110992 A1 | * | 4/2021 | Takahashi | H01J 37/244 |

\* cited by examiner

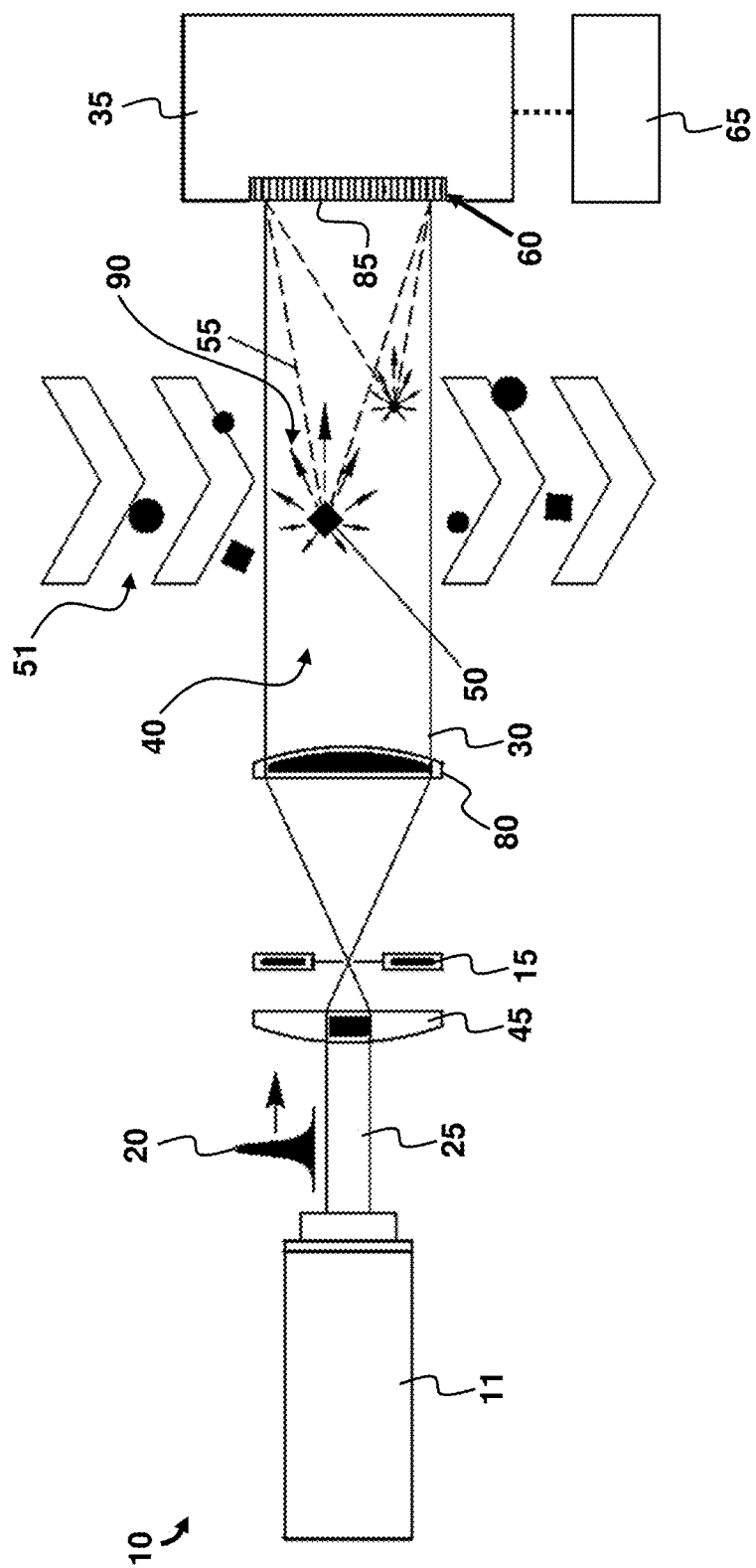

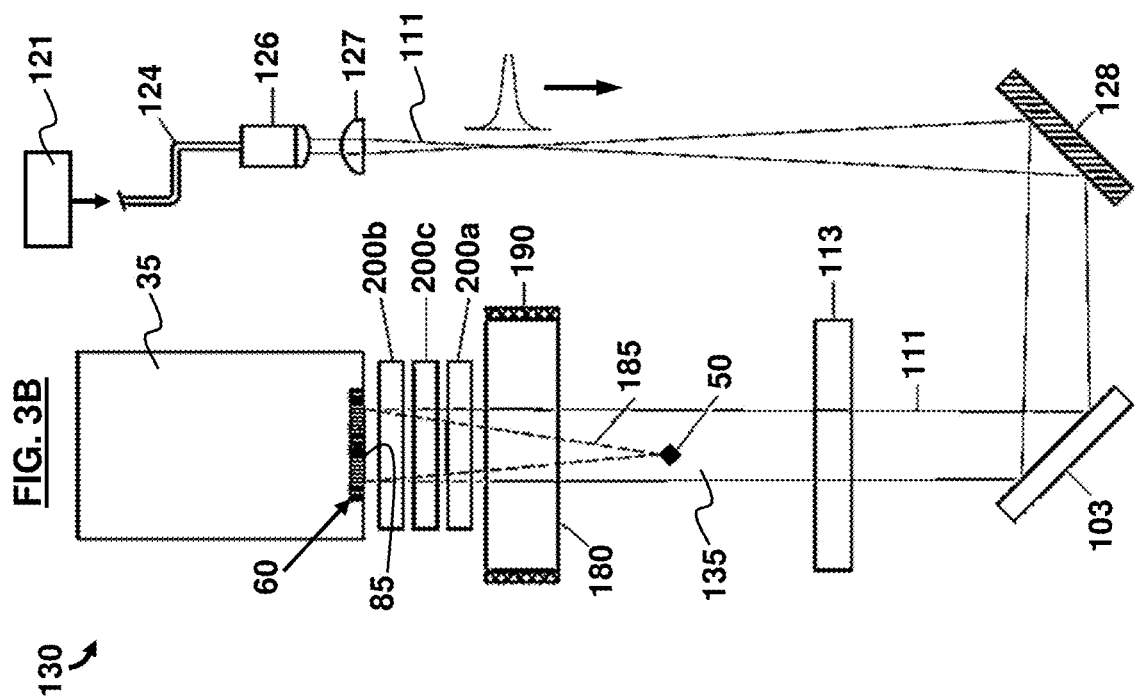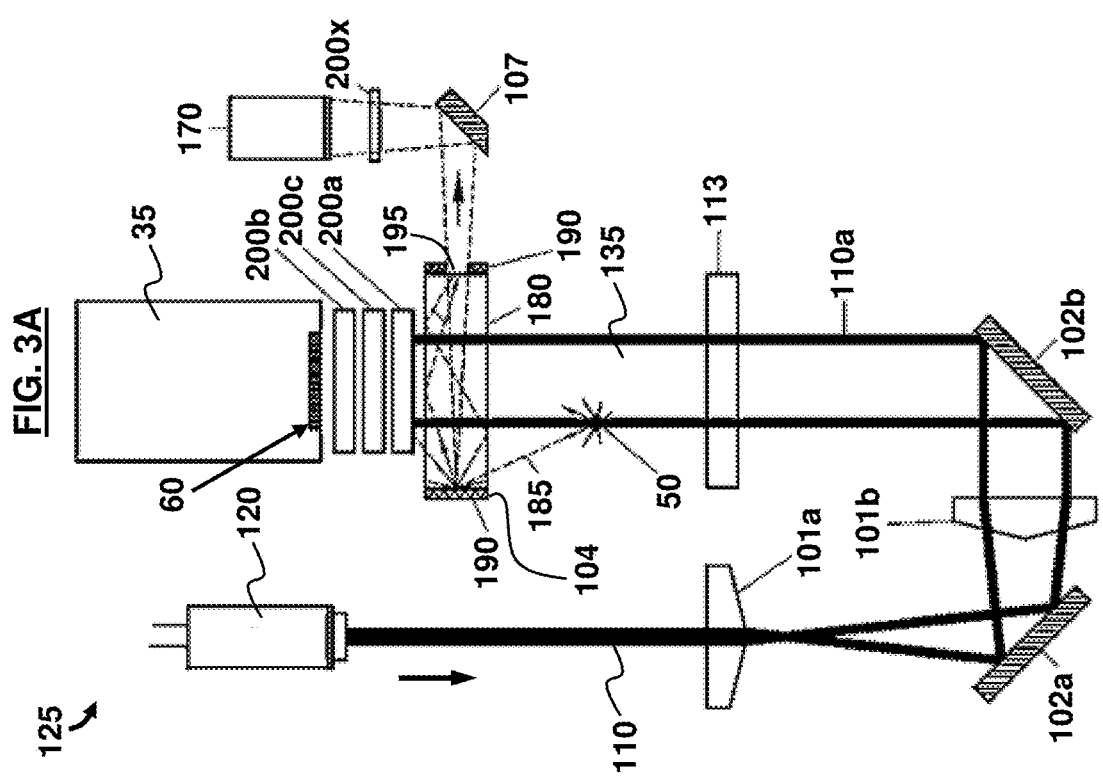

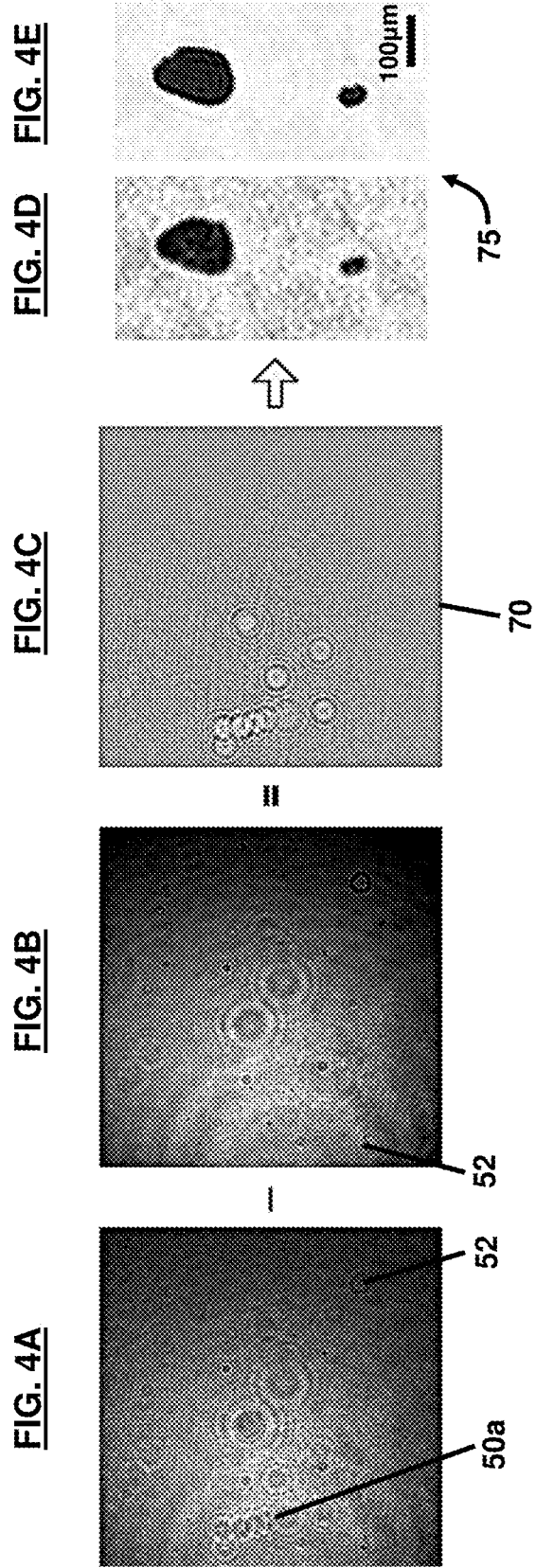

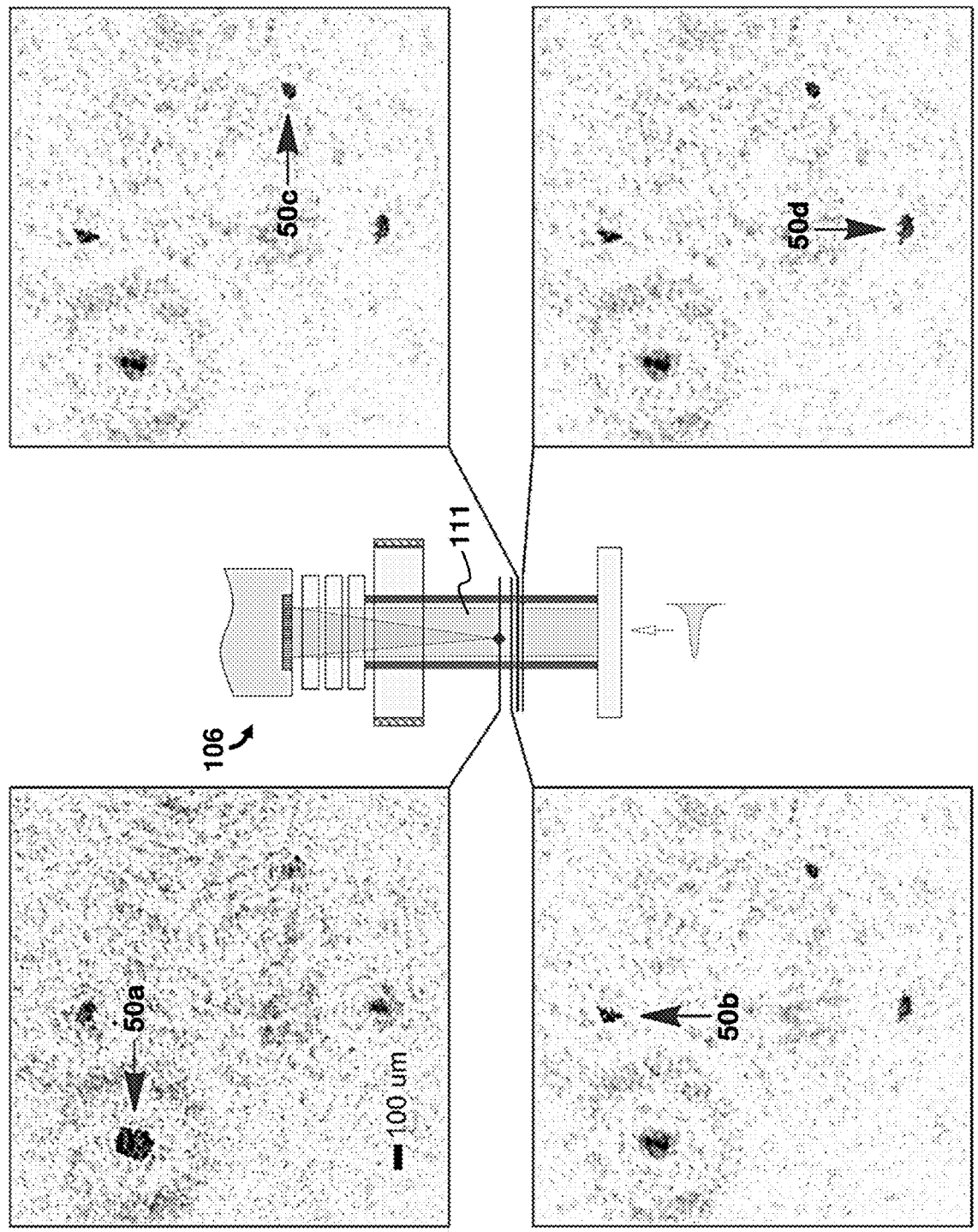

CONTACT-FREE HOLOGRAPHIC IMAGING OF AEROSOL PARTICLES FROM MOBILE PLATFORMS

GOVERNMENT INTEREST

The embodiments herein may be manufactured, used, and/or licensed by or for the United States Government without the payment of royalties thereon.

BACKGROUND

Technical Field

The embodiments herein generally relate to digital holography, and more particularly to aerosol particle imaging using digital holography techniques in a mobile platform.

Description of the Related Art

Perhaps the most consequential aspect of atmospheric aerosols is their effect on the Earth's energy budget via radiative forcing through sunlight absorption and scattering. Aerosol particles impact human health as well and serve as ice nuclei and cloud condensation nuclei thus influencing the hydrological cycle. Studies find that the estimated radiative forcing is comparable to all other forcing factors, including greenhouse gases. Yet, the uncertainty in the forcing value remains nearly as large as the value itself, meaning the effect of aerosols on climate is the least understood. The reason for this is, in part, due to the use of unrealistically simple particle proxies in light scattering simulations for the forcing inputs to general circulation models. Limited data is available for the true morphology of many particles, especially in the coarse mode aerosol (CMA) size range; i.e., particles nominally >1 μm in size. As such, distributions of spheres or ellipsoids are often used in conjunction with ground and satellite data in simulations of the forcing although more sophisticated treatments are beginning to appear. What is missing are accurate characterizations of aerosol distributions, as well as microphysical descriptions of the aerosols occurring in situ within the atmosphere.

The lack of characterization of aerosols and their loading is one of the greatest uncertainties in climate forcing. While aerosol loadings and their locations can be characterized using lidar techniques, the amount and direction of forcing also is determined by the microphysical properties of the aerosols, most especially their size and absorption properties. Generally, determining these properties can be performed only through sampling campaigns.

CMAs, such as airborne mineral dust (MD) and primary biological aerosol particles (PBAPs) represent an important component of the global atmospheric aerosol system. Such particles are important to study; e.g., because they can dominate the aerosol mass distribution in desert and agricultural regions and can be transported thousands of kilometers while making large contributions to the aerosol optical depth. Yet, both the shortwave and longwave radiative forcing of CMAs remains highly uncertain. It is even unclear whether CMA particles, MD in particular, have a net global heating or cooling effect on the atmosphere. The size-distributions of these aerosols continue to be poorly understood, and while some conventional microscopy has been done, a systematic quantitative description of particle shape, in particular, remains outstanding. Moreover, the accuracy of remote-sensing retrievals and climate models critically depends on the particle properties assumed, and thus, such work can benefit from more detailed observations.

The most suitable technique to study aerosol particles in their native environment is optical light scattering because such measurements can be made in a contact-free and rapid way. Since a particle's scattering pattern depends on its morphology, composition, and orientation, proper interpretation of a measured pattern can be useful for characterization. Unfortunately, no unambiguous relationship between a measured pattern and these particle characteristics is known, a difficulty known as the inverse problem. With the exception of spherical particles, conventional methods have largely failed to solve the inverse problem and confidently characterize arbitrary particles in situ. Indeed, coarse-mode particles are particularly challenging because of their large optical size, complex shape, and inhomogeneous composition. The lack of quantitative characterization of aerosol particles and their loading in the atmosphere is one of the greatest uncertainties in climate-change science. Instrumentation capable of determining the size and shape of aerosol particles is needed in efforts to reduce this uncertainty.

SUMMARY

In view of the foregoing, an embodiment herein provides a device comprising a filter that enhances a beam profile of a received pulsed laser; a first optical element to direct the pulsed laser as a reference wave towards an optical sensor; an open cavity positioned between the first optical element and the optical sensor, wherein the open cavity receives an aerosol particle, wherein the reference wave illuminates the aerosol particle, and wherein an illuminated particle generates and directs an object wave towards the optical sensor; a pixel array connected to the optical sensor, wherein the pixel array receives the reference wave and the object wave, and wherein the optical sensor creates a contrast hologram comprising an interference pattern of the illuminated particle; and a processor that creates an image of the illuminated particle based on the contrast hologram.

The aerosol particle may flow in the open cavity in a direction substantially transverse to the reference wave and from any direction in a plane perpendicular to a propagation direction of the reference wave. The device may comprise a second optical element to direct the pulsed laser from the filter. The optical sensor may comprise any of a charge coupled device (CCD), a complementary metal-oxide-semiconductor (CMOS) device, and an array of opto-electronic elements. The optical sensor may detect an interference pattern produced by unscattered and particle-scattered light constituting the object wave. The contrast hologram may comprise a transmission diffraction grating in a sensor plane to produce a diffracted light-field in an imaging plane.

Another embodiment provides an opto-electric system comprising an optics compartment that shapes, combines, and redirects a pair of laser beams; a sensing compartment operatively connected to the optics compartment, wherein the sensing compartment comprises a pair of laser sources that generate the pair of laser beams that are directed to the optics compartment, wherein a first laser beam of the pair of laser beams follows a trigger-beam path, and wherein a second laser beam of the pair of laser beams follows a hologram-beam path; a sensing region containing a particle, wherein the sensing region receives the redirected pair of laser beams causing the particle to become an illuminated particle; an optical sensor that detects the illuminated particle and creates a contrast hologram comprising an interference pattern of the illuminated particle. The opto-electric system further comprises an electronics compartment operatively connected to the sensing compartment, wherein the electronics compartment comprises a signal generator that generates a beam trigger signal upon the particle becoming illuminated; a control system that receives the beam trigger signal, and creates a delay in a pulse of the second laser beam; and a memory device that stores the contrast hologram of the illuminated particle. The opto-electric system further comprises a processor that creates an image of the illuminated particle based on the contrast hologram.

The first laser beam may comprise a first wavelength. The second laser beam may comprise a second wavelength different from the first wavelength. The second laser beam may be coaxial with and contained within the first laser beam. A pulse of the second laser beam may be delayed by the beam trigger signal. The second laser beam may illuminate the particle. The optics compartment may redirect the pair of laser beams to propagate along a shared coaxial beam axis. The sensing compartment may comprise a photomultiplier tube that receives a scattered portion of the first laser beam that indicates a presence of the particle in the sensing region, which causes the optical sensor to generate the beam trigger signal to cause the control system to create the delay in the pulse of the second laser beam.

The sensing compartment may comprise a window in the sensing region that traps light rays scattered by the particle that interacts with the first laser beam. The window may comprise a diffuse scattering coating causing the light rays to scatter into the window and become partially trapped therein by total internal reflection. The diffuse scattering coating may comprise an opening to direct a portion of the light rays to the photomultiplier tube. The sensing compartment may comprise a plurality of filters that filter ambient light and stray laser light from saturating the optical sensor. The contrast hologram may be recorded from the second laser beam. The particle that triggers the beam trigger signal may be approximately 10 μm and larger. The opto-electric system may comprise a housing containing the optics compartment, the sensing compartment, and the electronics compartment; and an aerospace vehicle to portably transport the housing for imaging the particle.

Another embodiment provides a method of generating a contrast hologram in a portable device, the method comprising receiving a pulsed laser; directing the pulsed laser as a reference wave towards an optical sensor; receiving, in a sensing cavity, an aerosol particle; illuminating the aerosol particle by the reference wave; generating an object wave by an illuminated particle; directing the object wave towards the optical sensor; and generating a contrast hologram of the illuminated particle based on interference patterns produced by unscattered and particle-scattered light created when the aerosol particle is illuminated. The method may comprise selectively delaying the pulsed laser to allow the aerosol particle to be selectively positioned with respect to the reference wave in the sensing cavity. The method may comprise creating an image of the aerosol particle based on the contrast hologram. The image may be created based on the aerosol particle being approximately larger than five micrometers in size.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1A is a schematic diagram illustrating a device containing a pulsed, expanded laser beam illuminating free-flowing aerosol particles and an optical sensor that records the interference pattern produced by unscattered and particle-scattered light, according to an embodiment herein;

FIG. 3A is a schematic diagram illustrating a layout of the trigger-beam path used to sense aerosol particles entering the sensing region of the opto-electric system of FIG. 2, according to an embodiment herein;

FIG. 3B is a schematic diagram illustrating a layout of the hologram-beam path used to form contrast holograms of the opto-electric system of FIG. 2, according to an embodiment herein;

FIG. 4A illustrates a raw hologram $I^{holo}$ obtained from a trigger event during an experimental flight of a holographic aerosol particle imager (HAPI) device near a pollinating spruce tree, according to an embodiment herein;

FIG. 4B illustrates a reference measurement $I^{ref}$ of the beam profile without aerosol particles present and showing numerous fringe-features due to particles that naturally collect on the windows isolating the internal components of the HAPI device from the environment, according to an embodiment herein;

FIG. 4C illustrates a contrast hologram $I^{con}$ showing elimination of most of the unwanted fringe-features, according to an embodiment herein;

FIG. 4D illustrates a reconstructed image of aerosol particles from $I^{con}$, according to an embodiment herein;

FIG. 4E illustrates the effect of a twin-image removal procedure on the image in FIG. 4D, according to an embodiment herein;

FIG. 5 illustrates images of aerosol particles reconstructed from a single hologram showing particles at different axial locations in the sensing region of the device of FIG. 1A, according to an embodiment herein;

FIGS. 6E through 6G are hologram-derived images of aerosol particles observed in a spruce tree trial, according to an embodiment herein;

DETAILED DESCRIPTION

Figure 1B:
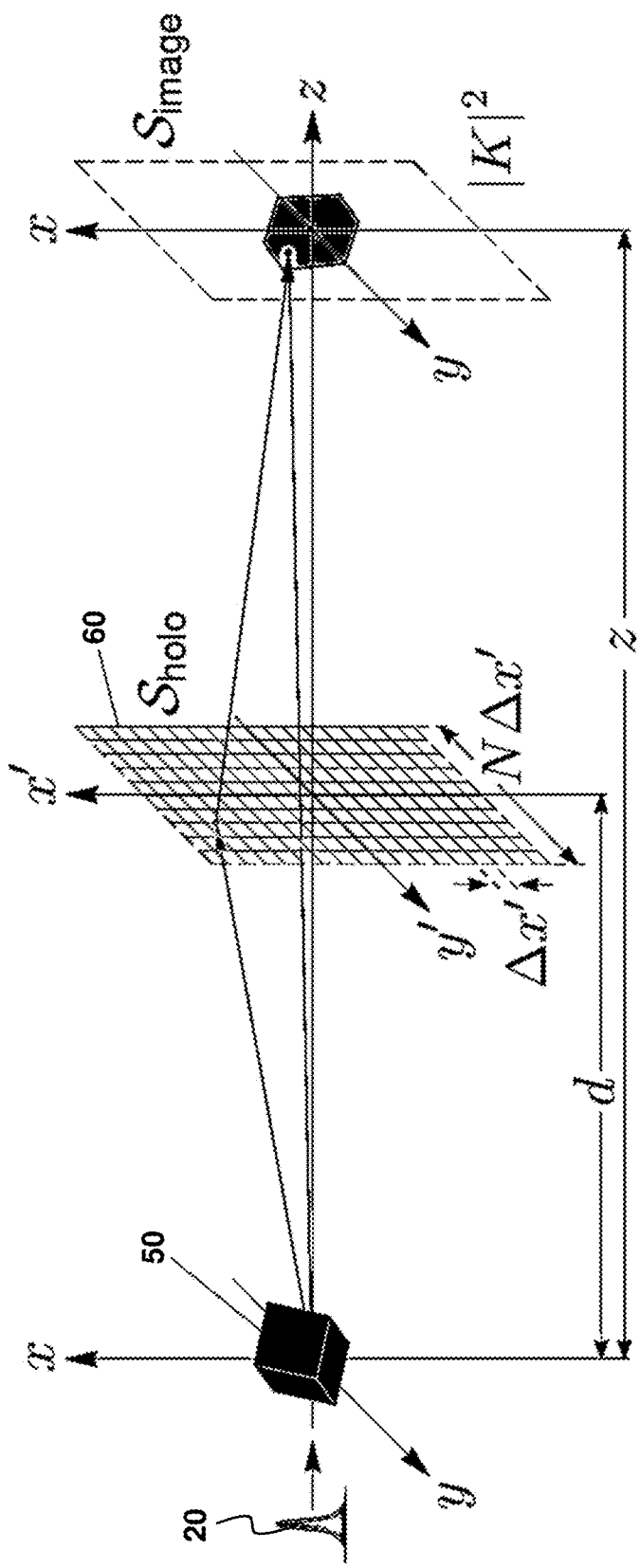
FIG. 1B is a schematic diagram of an image reconstruction process using the device of FIG. 1A where a contrast hologram is envisioned as a transmission diffraction grating in the plane $S_{holo}$ that produces an image $|K|^2$ in the plane $S_{image}$ through application of Rayleigh-Sommerfeld diffraction theory, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

It will be understood that when an element or layer is referred to as being "on", "connected to", or "coupled to" another element or layer, it may be directly on, directly connected to, or directly coupled to the other element or layer, or intervening elements or layers may be present. In contrast, when an element or layer is referred to as being "directly on", "directly connected to", or "directly coupled to" another element or layer, there are no intervening elements or layers present. It will be understood that for the purposes of this disclosure, "at least one of X, Y, and Z" may be construed as X only, Y only, Z only, or any combination of two or more items X, Y, and Z (e.g., XYZ, XYY, XZ, ZY, YZ, XX, YY, ZZ, etc.).

The embodiments herein provide a portable device, which may be carried by, or integrated with an unmanned aerial vehicle (UAV), drone, or other aerospace vehicle such as an airplane, helicopter, aerostat, blimp, balloon, or any other flying platform, and which images free-floating aerosol particles as they are in the atmosphere. Using digital holography, the devices obtains the images in a non-contact manner, resolving particles nominally larger than ten micrometers in size. The device is configured to image multiple particles freely entering its sensing volume from any direction via a single measurement and may comprise 3D printed components that enable a sufficiently low size and weight such that it may be flown on a commercial-grade UAV. The embodiments herein allow for in situ aerosol particle characterization in the field. Referring now to the drawings, and more particularly to FIGS. 1A through 8D, where similar reference characters denote corresponding features consistently throughout the figures, there are shown preferred embodiments. In the drawings, the size and relative sizes of components, layers, and regions, etc. may be exaggerated for clarity. The specific parameters, values, amounts, ranges, materials, types, brands, etc. described below are approximates and are merely provided as examples, and as such the embodiments herein are not limited to the specific descriptions and parameters below.

FIGS. 1A through 1D are schematic diagrams illustrating a device 10 to create digital holographic imaging of aerosol particles. As shown in FIG. 1A, the device 10 comprises a filter 15 that enhances a beam profile 20 of a received pulsed laser 25. A laser source 11 may generate the pulsed laser 25. In an example, the filter 15 comprises a pinhole spatial filter, although other types of filters are possible in accordance with the embodiments herein. The device 10 further includes a first optical element 45 to direct the pulsed laser 25 as a reference wave 30 towards an optical sensor 35. In some examples, the first optical element 45 may comprise a lens or mirror, or a combination thereof. According to some examples, the optical sensor 35 may comprise any of a charge coupled device (CCD), a complementary metal-oxide-semiconductor (CMOS) device, and an array of optoelectronic elements. The pulsed laser 25 (e.g., laser beam) is expanded by the filter 15, which improves the beam profile 20, which then illuminates the surface of the optical sensor 35.

The device 10 also includes an open cavity 40 positioned between the first optical element 45 and the optical sensor 35. The open cavity 40 receives an aerosol particle 50 (or one or more aerosol particles 50). The reference wave 30 illuminates the aerosol particle 50. An illuminated particle 50 generates and directs an object wave 55 comprising unscattered and particle-scattered light 90 towards the optical sensor 35. The terms object wave 55 and light 90 are used interchangeably herein. In an example, the aerosol particle 50 may be part of a flow 51 of aerosol particles that traverses the pulsed laser 25 (e.g., laser beam) at a distance of several centimeters, for example, from the optical sensor 35. Provided that the aerosol particle 50 is much smaller than the pulsed laser 25 beam diameter, the majority of the pulsed laser 25 propagates to the optical sensor 35 unperturbed. This portion is called the reference wave 30. The device 10 further comprises a pixel array 60 connected to the optical sensor 35. The pixel array 60 receives the reference wave 30 and the object wave 55. The optical sensor 35 creates a contrast hologram 70 comprising an interference pattern 85 of the illuminated particle 50.

The device 10 also includes a processor 65 that creates an image 75 of the illuminated particle 50 based on the contrast hologram 70. The processor 65 may be communicatively linked to the optical sensor 35 either through wired or wireless connection, etc. Various examples described herein with respect to the processor 65 may include both hardware and software elements. The examples that are implemented in software may include firmware, resident software, microcode, etc. Other examples may include a computer program product configured to include a pre-configured set of instructions, which when performed, may result in actions as stated in conjunction with the methods described herein. In an example, the preconfigured set of instructions may be stored on a tangible non-transitory computer readable medium or a program storage device containing software code.

In some examples, the processor 65 and various other processing devices described herein and/or illustrated in the figures may be embodied as hardware-enabled modules and may be configured as a plurality of overlapping or independent electronic circuits, devices, and discrete elements packaged onto a circuit board to provide data and signal processing functionality within a computer and/or electronic device. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such as Oracle® relational databases), the data objects can be configured as a table or column. Other configurations include specialized objects, distributed objects, object-oriented programming objects, and semantic web objects, for example. The data object models can be configured as an application programming interface for creating HTML and XML electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

The processor 65 may comprise any of an integrated circuit, an ASIC, FPGA, a microcontroller, a microprocessor, an ASIC processor, a digital signal processor, a networking processor, a multi-core processor, or other suitable processors. In some examples, the processor 65 may comprise a CPU of a computer or other device. In other examples the processor 65 may be a discrete component independent of other processing components in a computer or other device. In other examples, the processor 65 may be a microcontroller, hardware engine, hardware pipeline, and/or other hardware-enabled device suitable for receiving, processing, operating, and performing various functions required by a computer or other device.

The processing techniques performed by the processor 65 may be implemented as one or more software modules in a set of logic instructions stored in a machine or computer-readable storage medium such as RAM, ROM, PROM, firmware, flash memory, etc. in configurable logic such as, for example, PLAs, FPGAs, CPLDs, in fixed-functionality hardware logic using circuit technology such as, for example, ASIC, CMOS, or TTL technology, or any combination thereof. For example, computer program code to carry out processing operations performed by the processor 65 may be written in any combination of one or more programming languages.

According to an example, the aerosol particle 50 may flow in the open cavity 40 in a direction substantially transverse to the reference wave 30 and from any direction in a plane perpendicular to a propagation direction of the reference wave 30. The device 10 may comprise a second optical element 80 to direct the pulsed laser 25 from the filter 15. In some examples, the second optical element 80 may comprise a lens or mirror, or a combination thereof. The optical sensor 35 may detect the interference pattern 85 produced by unscattered and particle-scattered light 90 constituting the object wave 55. Moreover, the contrast hologram 70 may comprise a transmission diffraction grating 95 in a sensor plane to produce a diffracted light-field in an imaging plane. Accordingly, the small amount of light 90 scattered by the aerosol particle 50 received by the optical sensor 35 constitutes the object wave 55. This object wave(s) 55 interferes, producing an intensity fringe pattern $I^{holo}$ across the optical sensor 35, and it is this pattern that constitutes the contrast hologram 70. By pulsing the laser 25, any motion of flowing particles 55 can be frozen, permitting clear fringes to be resolved in the contrast hologram 70.

FIG. 1B depicts the reconstruction process that is applied to the recorded contrast hologram 70 to yield an image 75. In an example, the processor 65 creates the image 75 of the illuminated particle 50 based on the contrast hologram 70. The process conceptually follows that of diffraction. The contrast hologram 70 is viewed as a transmission diffraction grating 95 in the $S_{holo}$ plane such that illuminating the transmission diffraction grating 95 with the beam used to record the contrast hologram 70 produces a diffracted light-field K in an imaging plane $S_{holo}$. Rayleigh-Sommerfeld scalar diffraction theory is used to evaluate computationally this diffraction process, yielding the complex-valued K from the contrast hologram 70. Evaluating $|K|^2$ gives an intensity distribution that appears as a silhouette image of the particle 50. The other parameters detailed in FIG. 1B relate to the data processing procedures as further described below with respect to the method 300 of FIGS. 7A through 7C.

Figure 1C:
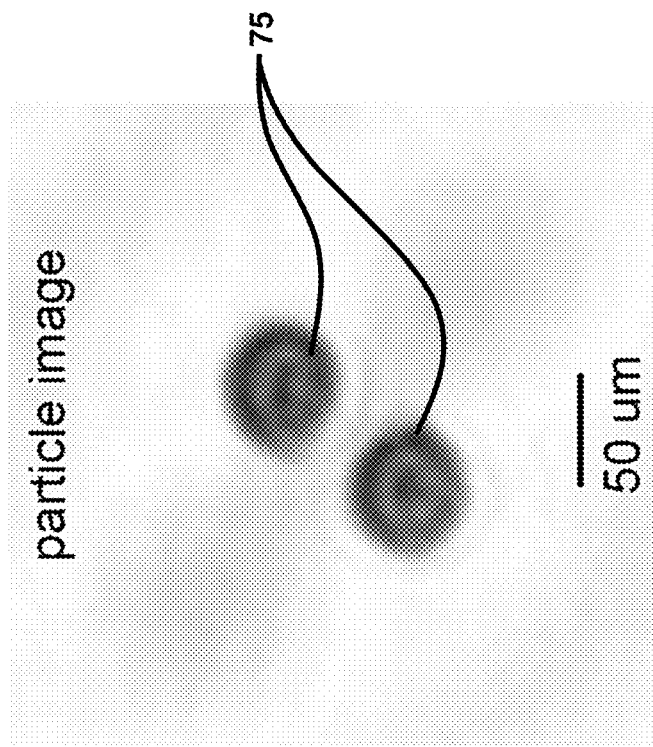
FIG. 1C is a contrast hologram for an aerosol of spherical particles obtained using the device of FIG. 1A and image reconstruction process of FIG. 1B, according to an embodiment herein.
Figure 1D:
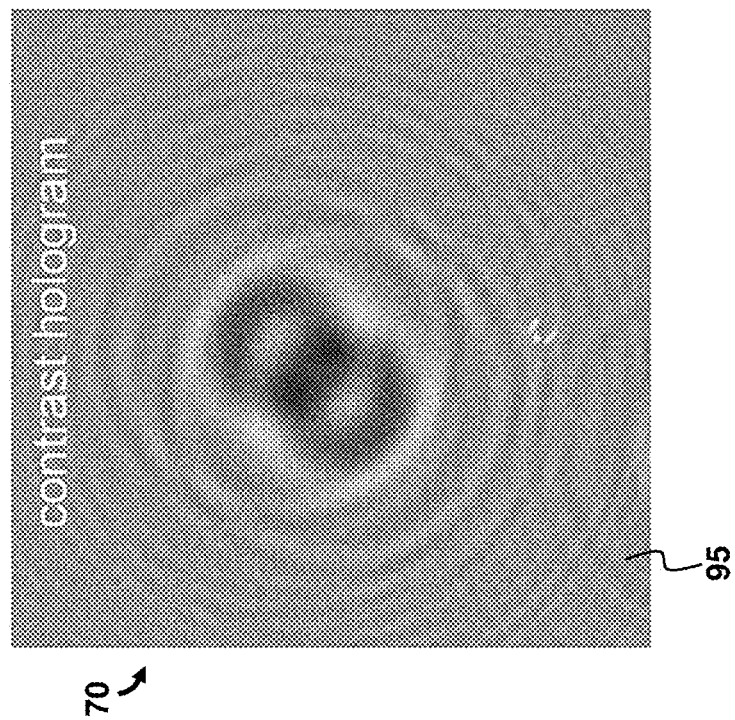
FIG. 1D is a particle image obtained from the contrast hologram of FIG. 1C, according to an embodiment herein.

Again, with reference to FIGS. 1A through 1D, the process is not applied directly to $I^{holo}$ but rather, to the contrast hologram 70 ($I^{con}$), which is produced after subtracting a background measurement, $I^{ref}$. This subtraction step improves the hologram fringe contrast and eventual image 75. An example of a contrast hologram 70 yielded by the aerosol particle measurements provided by the device 10 is shown in FIG. 1C along with the reconstructed image 75 shown in FIG. 1D. Because of the in-line optical configuration, both a real and virtual image 75 of the particle 50 is produced. When one image is reconstructed with best focus, the other image, the twin, is unfocused and perturbs the focused image. Several well-known strategies are available to minimize, or remove, the unfocused twin and to remove the effects of the twin.

One aspect of digital holography is that optical phase information is encoded in the intensity interference pattern measurement. In other words, the function K is complex valued in the x-y plane, $K \in C^2$, which ultimately accounts for the ability to form the image 75 via scalar diffraction theory. A great variety of useful analysis can be derived from this unique property extending beyond aerosol applications including three-dimensional sub-micron imaging of biological cells, among others. The unique potential of digital holography for aerosol characterization is highlighted by the multiple instruments recently developed to study a variety of aerosol properties in different settings. These include an aircraft-mounted instrument for cloud-ice particle imaging, a stationary instrument for mixed-phase cloud imaging, a submersible digital holography imager, a digital holography cloud imager for cable cars, and a stationary pollen imager.

Figure 2:
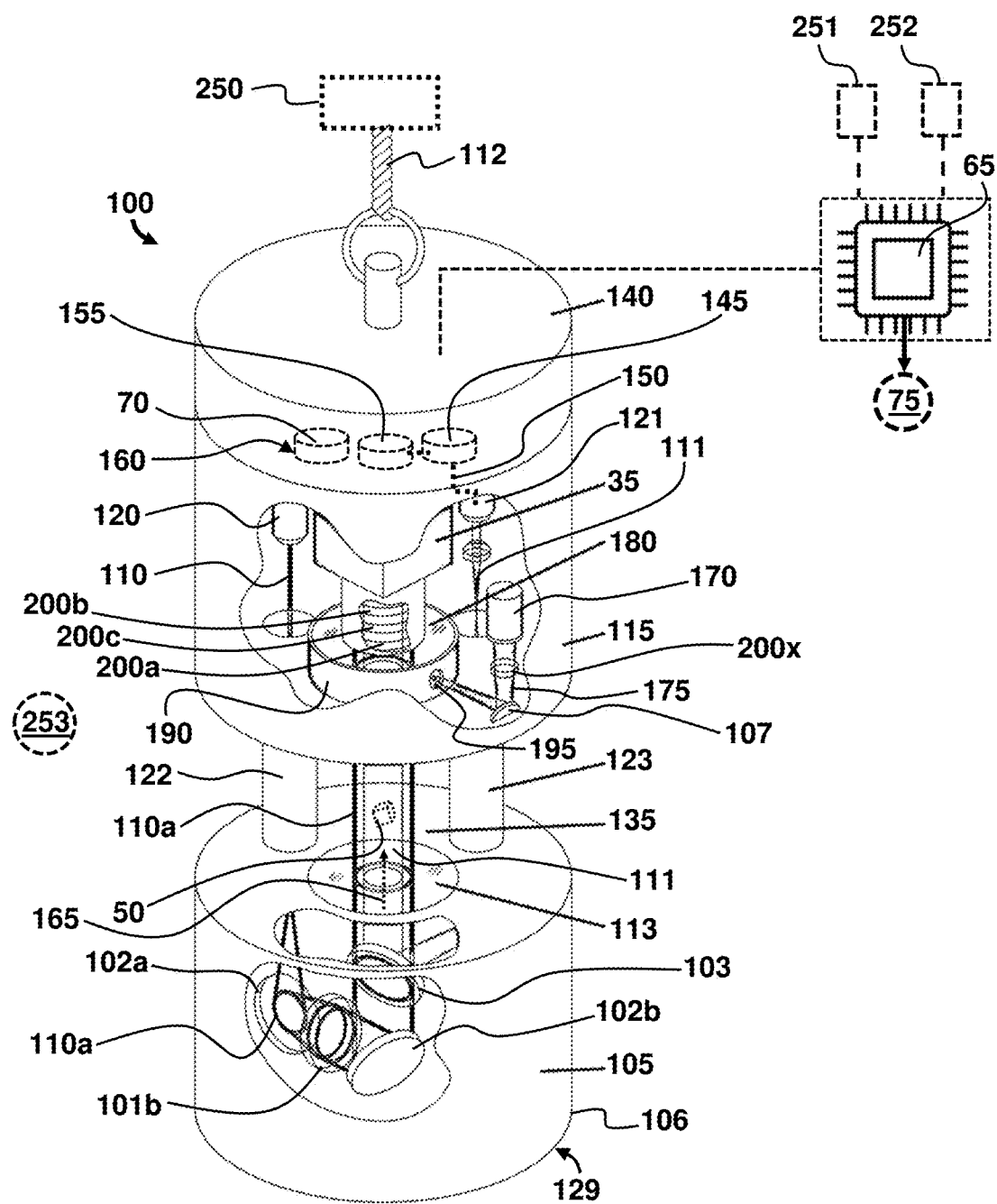
FIG. 2 is a schematic diagram illustrating an opto-electric system, according to an embodiment herein.

FIG. 2, with reference to FIGS. 1A through 1D, illustrates a schematic diagram of an opto-electric system 100. In an example, the opto-electric system comprises an optics compartment 105, a sensing compartment 115, and an electronics compartment 140 that are operatively and communicatively coupled together. In another example, the optics compartment 105, the sensing compartment 115, and the electronics compartment 140 are arranged as three stacked cylindrical containers, as shown in FIG. 2. The opto-electric system 100 comprises an optics compartment 105 that shapes, combines, and redirects a pair of laser beams 110, 111 (e.g., first laser beam 110 and second laser beam 111). The system 100 further includes a sensing compartment 115 operatively connected to the optics compartment 105. The sensing compartment 115 comprises a pair of laser sources 120, 121 that generate the pair of laser beams 110, 111 that are directed to the optics compartment 105. In an example, a first laser source 120 generates the first laser beam 110, and a second laser source 121 generates the second laser beam 111. A first laser beam 110 of the pair of laser beams 110, 111 follows a trigger-beam path 125 (as shown in FIG. 3A), and a second laser beam 111 of the pair of laser beams 110, 111 follows a hologram-beam path 130 (as shown in FIG. 3B).

Again, with reference to FIG. 2, the sensing compartment 115 further comprises a sensing region 135 containing a particle 50. The first laser beam 110 may comprise a first wavelength. In an example, the second laser beam 111 may comprise a second wavelength different from the first wavelength. The first laser beam 110 and second laser beam 111 may be directed from the sensing compartment 115 to the optics compartment 105 through a pair of beam tunnels 122, 123. In the optics compartment 105, the first laser beam 110 is expanded and formed into a collimated, hollow, annular beam 110a by a pair of axicon lenses 101a, 101b (Lens 101a is hidden in the view of FIG. 2, but is shown in FIG. 3A). The first laser beam 110 and the annular beam 110a are the same beam and are used interchangeably below, whereby the annular beam 110a is simply the collimated, hollow, annular form of the first laser beam 110. The annular beam 110a is folded by a pair of mirrors 102a, 102b. Next, the annular beam 110a is passed through a dichroic mirror 103 and a sapphire window 113 to the sensing region 135 and towards the sensing compartment 115 (i.e., in a vertical direction according to the orientation shown in FIG. 2).

According to an example, the second laser beam 111 may be coaxial with and contained within the first laser beam 110 (e.g., annular beam 110a). In a non-limiting example, the first laser beam 110 may comprise a red laser and the second laser beam 111 may comprise a green laser. The second laser beam 111 may illuminate the particle 50. The sensing region 135 receives the redirected pair of laser beams 110, 111 causing the particle 50 to become an illuminated particle 50. The system 100 also includes an optical sensor 35 that detects the illuminated particle 50 and creates a contrast hologram 70 comprising an interference pattern 85 of the illuminated particle 50.

Moreover, the system 100 comprises an electronics compartment 140 operatively connected to the sensing compartment 115. The electronics compartment 140 comprises a signal generator 145 that generates a beam trigger signal 150 upon the particle 50 becoming illuminated. The electronics compartment 140 further comprises a control system 155 that receives the beam trigger signal 150 and creates a delay in a pulse of the second laser beam 111. In an example, the pulse of the second laser beam 111 may be delayed by the beam trigger signal 150. The contrast hologram 70 may be recorded from the second laser beam 111. According to an example, the particle 50 that triggers the beam trigger signal 150 may be approximately 10 μm and larger. Additionally, the electronics compartment 140 contains a memory device 160 that stores the contrast hologram 70 of the illuminated particle 50. The memory device 160 may be a computer memory device such as a memory card, flash memory, or any other suitable type of memory device.

The system 100 also includes a processor 65 that creates an image 75 of the illuminated particle 50 based on the contrast hologram 70. In an example, the processor 65 may be part of the electronics compartment 140. In another example, the processor 65 may be remotely located from the electronics compartment 140, but may be communicatively linked to the electronics compartment 140; e.g., through wireless connection, etc. According to an example, the processor 65 may utilize global positioning system (GPS) capabilities and/or be communicatively linked to a GPS device 251 to identify a geographical location of where the particle 50 is imaged to tie the collection location to the image 75. Moreover, in another example, the altitude where the particle 50 is imaged may also be detected by an altimeter or other similar device 252 that is communicatively linked to the processor 65, and which can tie this information to the image 75 as well.

As described above, the optics compartment 105 may redirect the pair of laser beams 110 (e.g., annular beam 110a), 111 to propagate along a shared coaxial beam axis 165. The sensing compartment 115 may comprise a photomultiplier tube 170 that receives a scattered portion 175 of the first laser beam 110 (e.g., annular beam 110a) that indicates a presence of the particle 50 in the sensing region 135, which causes the optical sensor 35 to generate the beam trigger signal 150 to cause the control system 155 to create the delay in the pulse of the second laser beam 111. The sensing compartment 115 may comprise a window 180 in the sensing region 135 that traps light rays 185 (shown in FIG. 3A) scattered by the particle 50 that interacts with the first laser beam 110 (e.g., annular beam 110a). In an example, the window 180 may comprise a diffuse scattering coating 190 causing the light rays 185 (shown in FIG. 3A) to scatter into the window 180 and become partially trapped therein by total internal reflection. The diffuse scattering coating 190 may comprise an opening 195 to direct a portion of the scattered portion 175 of the annular beam 110, which may be in the form of light rays 185 (shown in FIG. 3A) to a mirror 107 for redirection to and through a narrow-line filter 200x and then to the photomultiplier tube 170. In an example, the sensing compartment 115 may comprise a plurality of filters 200a, 200b that filter ambient light and stray laser light from saturating the optical sensor 35. A linear polarizer 200c matched to the second beam 111 may be positioned between the plurality of filters 200a, 200b, according to an example.

The electronics compartment 140 is configured to house the control system 155 and hologram storage systems (e.g., memory device 160). The sensing compartment 115 is configured to house optical sensor 35 and laser sources 120, 121. The optics compartment 105 is where the pair of laser beams 110, 111 are shaped and combined. An aerospace vehicle, such as a UAV, etc. 250 can carry the system 100 through the atmosphere via a tether 112, for example, collecting contrast holograms 70 of aerosol particles 50 that pass through the sensing region 135. The optics compartment 105, which assists with these measurements, comprises the two beam-paths described above; namely, the trigger-beam path 125 and the hologram-beam path 130, and which are further described below with respect to FIGS. 3A and 3B.

FIG. 2 illustrates the system 100 embodied as a holographic aerosol particle imager (HAPI) instrument 106 including the two beam paths 125, 130 discussed above. In an example, the HAPI instrument 106 may be cylindrical in form, approximately 20 cm in diameter and 42 cm in length, although other shapes, configurations, and sizes may be possible in accordance with the embodiments herein. In an example, the tether 112 is sufficiently long that the HAPI instrument 106 can be placed in upright orientation a few meters from the UAV 250 before liftoff and minimizes mechanical vibration of the HAPI instrument 106 due to the UAV rotors when aloft. Upon landing, the tether 112 also allows the HAPI instrument 106 to be set on the ground in an upright orientation with the UAV 250 landing nearby. In another example, the HAPI instrument 106 may be raised or lowered with the tether 112 using a winch or other similar device (not shown) connected to the aerospace vehicle 250. The system 100 may also comprise a housing 129 containing the optics compartment 105, the sensing compartment 115, and the electronics compartment 140. Moreover, according to an example, an aerospace vehicle 250 may be provided to portably transport the housing 129 (containing the optics compartment 105, the sensing compartment 115, and the electronics compartment 140) for imaging the particle 50 from the air 253 adjacent to the housing 129. In another example, the housing 129 may further comprise the processor 65. Furthermore, the aerospace vehicle 250 may be operatively connected to the housing 129 by the tether 112 or the housing 129 may be integrated with the aerospace vehicle 250, according to various examples.

FIG. 3A, with reference to FIGS. 1A through 2, shows the trigger-beam path 125, which is used to sense the presence of aerosol particles 50 and provide the beam trigger signal 150 to the control system 155. In an example, the optical arrangement may be composed of a CW 4.5 mW, $\lambda_r$=635 nm (red) diode laser module, which is expanded and formed into a collimated, hollow, annular beam 110a approximately 1.5 cm in diameter by a pair of axicon lenses 101a, 101b, each with an approximately 20° apex angle. The annular beam 110a is folded by a pair of mirrors 102a, 102b. Next, the annular beam 110a is directed back towards the optical sensor 35, which contains the pixel array 60. Then, the annular beam 110a is passed through a dichroic mirror 103 (shown in FIGS. 2 and 3B) and a sapphire window 113 to the sensing region 135.

A particle 50 entering the sensing region 135 from any direction is illuminated by this annular beam 110a, resulting in a small portion of the light rays 185 to be scattered. These scattered light rays 185 are most intense in the forward direction, which is the vertical direction in FIG. 3A, and the scattered light rays 185 then encounter an approximately 1 cm thick (for example) silica window 180 with an anti-reflection (AR) coating. In an example, the window 180 may comprise a substantially cylindrical configuration, although other shapes and configurations are possible in accordance with the embodiments herein. The side (edge) 104 of the window 180 has the texture of ground glass and is coated with a reflective paint forming a diffuse scattering coating (DSC) 190. A small portion of particle-scattered light rays 185 enters the window 180 and strikes the DSC 190, whereby the light rays 185 are scattered back into the glass window 180 and a portion of the light rays 185 becomes trapped via total internal reflection in the window 180. A small opening 195 in the DSC 190 allows a portion of this trapped light rays 185 to exit the window 180 where the light rays 185 are reflected by mirror 107 to a sensitive micro PMT 170. The PMT 170 is guarded by a narrow-line filter 200x to prevent saturation by ambient sunlight or stray laser light. In this way, the window 180 acts as a collector for the weak scattered light rays 185 from particles 50 entering the sensing region 135 from any direction, and the signals from the PMT 170 become triggers for the hologram recording process, as shown in FIG. 3B and further described below.

FIG. 3B, with reference to FIGS. 1A through 3A, illustrates the hologram-beam path 130, which is used to generate the holographic interference patterns 85 on the optical sensor 35. In an example, the laser source 121 generates a 30 mW diode-pumped solid-state laser (e.g., second laser beam 111) of wavelength $\lambda_g$=514 nm; i.e. green, with a fiber pigtail 124 mated to a fiber collimator 126. The second laser beam 111 is passed to a lens 127, such as a 125 mm focal length positive lens, for example, and diverges moderately as the second laser beam 111 propagates such that the second laser beam 111 is approximately one centimeter in diameter at the optical sensor 35. After being folded by a mirror 128, the second laser beam 111 is reflected (vertically as per the orientation in FIG. 3B) by the longpass dichroic mirror 103 (cutoff 605 nm), and then the second laser beam 111 is directed through the sapphire window 113 and into the sensing region 135. The dichroic mirror 103 allows the second laser beam 111 to be coaligned with the hollow annular beam 110a (e.g., first laser beam 110) such that both propagate along the same axis 165 as shown in FIG. 2 through the sensing region 135.

A particle 50 scattering the annular beam 110a as light rays 185 and activating the trigger system (e.g., the control system 155 that receives the beam trigger signal 150 from the signal generator 145 and creates a delay in the pulse of the second laser beam 111) will continue to travel where the particle 50 is then illuminated by the pulse of the second laser beam 111. Scattered and unscattered light rays 185 propagate through the DSC window 180 and then encounter a series of filters 200a-200c, which include a linear polarizer 200b, a narrow line filter 200a with a center wavelength of 514.5±1 nm, and a shortpass filter 200c (cutoff 550 nm). The light rays 185 are blocked by the filters 200a-200c and do not reach the pixel array 60. The second laser beam 111 passes the filters 200a-200c and is received by the pixel array 60 of the optical sensor 35. In an example, the pixel array 60 comprises a 4096×3000 array of 3.45×3.45 $\mu m^2$ pixels and a raw hologram, $I^{holo}$ is recorded from the second laser beam 111. The sequence of filters 200a-200c blocks enough ambient sunlight and stray trigger-beam (e.g., annular beam 110a) light that the optical sensor 35 is not saturated.

Because it is not possible to measure a guaranteed no-particle hologram in the field, acquiring a good reference $I^{ref}$ for the image reconstruction process is challenging. For this purpose, a dynamical reference calculation is used, where a median intensity value is assigned to each pixel from a sequence of reference measurements at the beginning of each field trial. This process eliminates transient features such as flowing particles, while keeping stable features such as dust specks and other artifacts. A moving time window may be used to select which raw holograms to include for each hologram to ensure good references even when ambient light levels change; e.g., changes in cloud cover during a given measurement session.

As indicated above, when a particle 50 enters the sensing region 135, the particle first encounters the CW annular red-laser beam (e.g., first laser beam 110) of wavelength $\lambda_r$=635 nm. The particle 50 scatters a small portion of the light 185, which is then detected by the PMT 170 providing the trigger signal 150 to the control system 155. This trigger queues a pulse from the second laser beam 111 of wavelength $\lambda_g$=514 nm that is adjustable in length between $\tau$=10-200 ns. In an example, the second laser beam 111 is approximately one centimeter in diameter and is coaxial with and contained within the first laser beam 110 (e.g., annular beam 110a). The beam paths 125, 130 are oriented perpendicular to each other and the beams 110, 111 overlap coaxially. An electronic delay in the control system 155 allows time for the particle 50 to pass from the annulus of the first laser beam 110 (e.g., annular beam 110a) into the hologram-beam path 130 by the time the pulse is activated. In this way, it possible to record a digital contrast hologram 70 of all particles 50 in the hologram-beam path 130 and reconstruct the particle image 75 post-measurement.

While it is possible to reconstruct particle images 75 directly from the measured contrast hologram 70, improved images 75 may be obtained by performing a background subtraction procedure. This entails readout of the optical sensor 35 illuminated by a pulse when no particles 50 are present; i.e., it is simply a recording of the undisturbed beam profile. Subtracting this measurement, $I^{ref}$, from a raw hologram $I^{holo}$ with particles 50 present yields a contrast hologram $I^{con}=I^{holo}-I^{ref}$. The resulting particle image 75 is improved because stray light and sensor noise largely cancel out in the difference improving the fringe-pattern contrast. FIGS. 4A through 4E, with reference to FIGS. 1A through 3B, show an example from an experimental flight of the system 100 around an actively pollinating spruce tree. Raw and reference measurements are shown in FIGS. 4A and 4B, which contain the aerosol particle interference fringes 50a and dust interference fringes 52, subtracted to yield $I^{con}$ in FIG. 4C, which is then processed to give an image 75 of aerosol particles 50 in FIG. 4D present in the system 100 during a trigger event. FIG. 4E shows the result of applying the twin-image removal to the reconstructed image in FIG. 4D.

In an example, the control system 155 may be configured as an electronic circuit that monitors the output voltage of the PMT 170 for changes of a sufficient magnitude, which correspond to reception of weakly scattered light rays 185 by particles 50 entering the annular beam 110a. The voltage level required to activate the control system 155 is defined by an adjustable threshold $V_{th}$. Once $V_{th}$ is exceeded, the electronic shutter (not shown) of the optical sensor 35 is activated and a transistor-transistor logic beam trigger signal 150 is transmitted to the second laser source 121 to initiate emission of a pulse. The electronic-shutter of the optical sensor 35 then closes and the exposure is sent for storage to the memory device 160 and for real-time or subsequent analysis by the processor 65. For example, using the hardware in the electronics compartment 140 and/or data streaming bandwidth to a ground station, the fast image-reconstruction process could be implemented in near real-time.

Despite the narrow line filter 200x guarding the PMT 170, there is always a small amount of ambient sunlight that reaches the PMT 170. Particles 50 entering, and thus scattering, the trigger beam (e.g., second laser beam 111) add to this fluctuating signal by different amounts depending on their size. Moreover, the gain G of the PMT 170 can be adjusted by a control voltage $V_C$, giving a gain that is an exponential function of $V_C$, ranging from G=1 to $10^5$. The control system 155 determines the proper value for $V_C$ that yields a gain sufficient to trigger from particles 50 and this is performed at the beginning of each measurement event. If the gain is too high, then the control system 155 triggers continuously from the ambient sunlight, and if the gain is too weak, then even the largest particles may not trigger the control system 155. With the system 100 placed in an environment where the measurements are to be performed; e.g., on the ground or in a stable hover, a search algorithm finds the appropriate levels for $V_{th}$ and $V_C$ that will prevent triggers from the ambient sunlight level while still allowing triggers from particles 50 approximately 10 μm and larger. This does not mean, however, that only particles 50 of this size are imaged by the system 100. For example, a large particle >10 μm will cause a trigger, but several far smaller particles will also be in the path of the second laser beam 111, and thus, are also imaged. Examples of these smaller particles can be seen in FIGS. 6B, 6C, and 6E, as further described below.

Once a trigger event occurs, the second laser beam 111 emits a pulse with an adjustable duration between $\tau$=10-200 ns. Assuming a relative motion of 1 m/s for the particles, a $\tau$=100 ns pulse corresponds to a shift in particle position of 100 nm, or approximately one fifth of a wavelength, during the illumination of the particle 50. Thus, a clear interference (fringe) pattern 85 is detected by the optical sensor 35. The exposure time of the optical sensor 35 can be adjusted between 1 and 10 ms, for example, such that the exposure time encompasses the laser pulse. Due to the filters 200a-200c guarding the optical sensor 35, the background sunlight and trigger beam (e.g., annular beam 110a) contributes negligibly to an exposure even 10 ms in length. Additionally, the laser pulse can be delayed between 1 and 10 ms, for example, to allow the particles 50 to travel closer to the center of the path of the second laser beam 111 in the sensing region 135.

According to an example, the memory device 160 comprises a sufficient memory capacity (e.g., at least 64 GB) such that at sampling rates of approximately 1 Hz, over two hours of continuous measurements can be conducted, which greatly exceeds the typical instrument-flight duration. Alternatively, it is possible to stream data to a remote laptop computer or other device via a wireless connection. In an example, to facilitate real-time monitoring of the data, a thumbnail view may be created for each contrast hologram 70 by the processor 65 that is sufficiently small in file size (e.g., under 200 kB) that it is streamed to a user's laptop computer, etc. In this way, the user is able to tell if useful data is being collected.

Experiment

Following extensive performance characterization and calibration tests in a laboratory setting, a HAPI instrument 106, such as the one shown in FIG. 2 is flown in proximity to active CMA particle sources. These include a pollinating spruce tree as a PBAP source and vehicular traffic on a dirt farm road as an MD source. These experimental trials are referred to as "spruce tree" and "road dust," respectively. The field trials are conducted midday in clear weather with calm winds to avoid control issues with the UAV 250 that is used to transport the HAPI instrument 106 and to minimize the swinging motion of the tethered HAPI instrument 106. When flown, the HAPI instrument 106 samples the atmosphere over a vertical height of approximately one to 33 meters, which roughly corresponds to the physical height of the spruce tree. The duration of the flights varies, but all are under 15 minutes in duration.

Figure 6A:
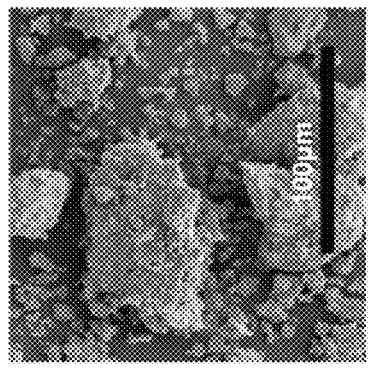
FIGS. 6A through 6C are hologram-derived images of aerosol particles observed in a road dust field trial, according to an embodiment herein.
Figure 6E:
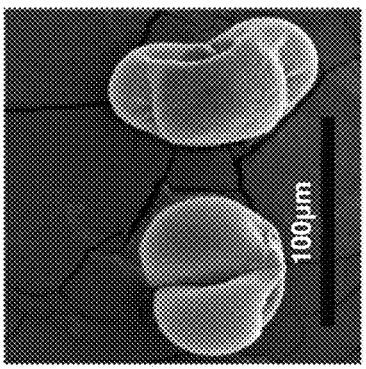
Figure 6B:
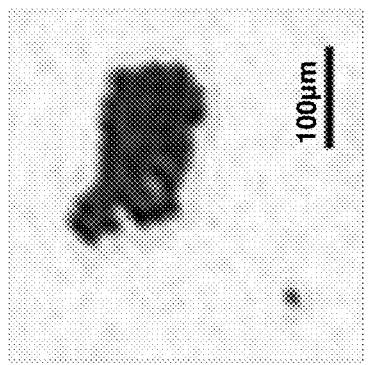
Figure 6F:
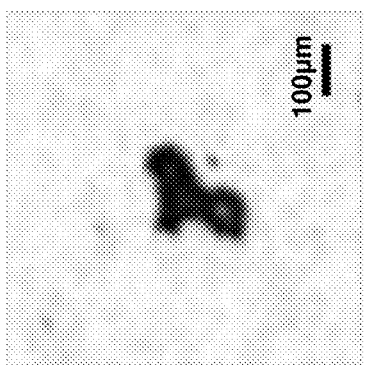
Figure 6C:
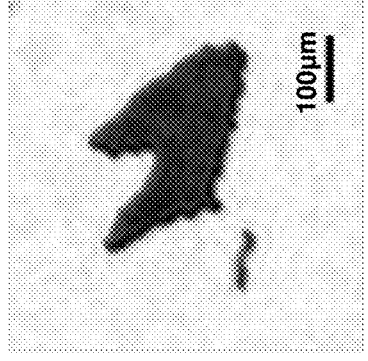
Figure 6D:
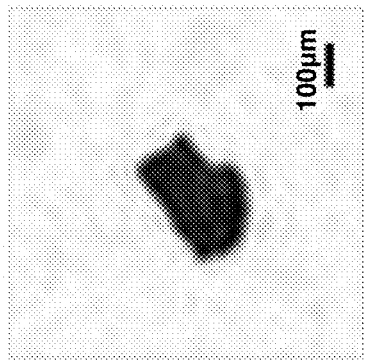
FIG. 6D is a scanning electron microscope (SEM) image of particles collected from a road dust site, according to an embodiment herein.
Figure 6H:
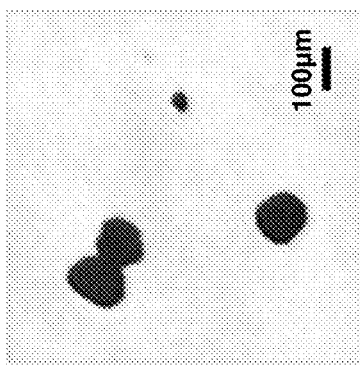
FIG. 6H is a SEM image of pollen particles collected from a spruce tree, according to an embodiment herein.

FIGS. 5 through 6H, with reference to FIGS. 1A through 4E, illustrates the imaging capability of the HAPI instrument 106. The arrows in the images in FIG. 5 show the particles that are in best focus. FIGS. 5 through 6H highlight the capability of holographic imaging using the techniques provided by the embodiments herein. The results presented in FIGS. 5 through 6H are from flights of the HAPI instrument 106 in the two field trials described above. In FIG. 5, the aerosol source is traffic on a dirt road in an agricultural research farm. When a trigger event occurs and the hologram-forming pulse is emitted, all particles 50 present in the portion of the hologram beam-path (i.e., second laser beam 111) in the sensing region 135 will contribute to the recorded contrast hologram 70. Thus, in principle, the image reconstruction process can recover images of all of these particles 50. The sensing region 135 is defined by the cross-sectional area of the hologram beam (i.e., second laser beam 111), approximately one centimeter in diameter, and the distance between the sapphire window 113 and the window 180 in FIG. 2, which may be approximately four to five centimeters, according to an example.

As shown in FIG. 5, four such particles 50a, 50b, 50c, 50d are presented where their location in the second laser beam 111 differs as shown in relation to the HAPI instrument 106. Due to the field setting and particle size, these particles 50a-50d are likely MD suspended by the mechanical action of the road traffic. Simply adjusting the focus distance parameter z in Eq. (1) below allows each particle 50a-50d to be brought into focus individually from a single contrast hologram 70, illustrating the significant advantage holographic imaging of aerosol particles has over conventional imaging. That is, it would be highly challenging to; e.g., use a long working-distance microscope objective and translate it over distances of centimeters on the time scales necessary to capture focused images of all of these particles before they flow out of the sensing volume.

FIGS. 6A through 6H illustrate further examples of particles observed in the two field trials. Road dust exhibits an irregular shape expected for MD while the spruce tree particles show a less complex, smooth shape. Samples of road dust and pollen from the tree are collected and imaged with a scanning electron microscope (SEM) and shown in FIGS. 6G and 6H. Qualitatively, the particles in the SEM images (FIGS. 6G and 6H) appear very similar to those imaged by the HAPI instrument 106 (FIGS. 6A to 6C and 6E to 6G), which would support the identification of the particles in FIGS. 6A to 6C as MD and FIGS. 6E to 6G as spruce tree pollen. Indeed, the HAPI-imaged pollen particles in FIG. 6F show hints of the distinctive concavity, or dimple, as those seen in the SEM image and in the literature. Moreover, their size is consistent with the SEM images.

Qualitative comparison of the aerosol particle images with the SEM images supports an identification of the road dust particles as MD and of the spruce tree particles as pollen grains. When studies of pollen grains are undertaken, it is common for the grains to be collected from a source, transferred to a laboratory, and then imaged with optical or electron microscopy; e.g., FIG. 6H. In the process, it is likely that the grains become desiccated and crumple, and in such cases, the resulting microscope images will convey an aberrated sense for the true particle shape. This complication is avoided with the HAPI instrument 106 because the contrast holograms 70 of the particles 50 are recorded in situ in the immediate vicinity of the tree as it emits live pollen grains. Thus, aside from the limited image resolution, the HAPI images can be regarded as more representative of the true particle shape than one would have from ex situ microscopy of dried pollen.

The core challenge with the mechanical design of the HAPI instrument 106 is to balance the stability requirements of optical control with minimization of the total mass and the size of the HAPI instrument 106. Additionally, the two-beam optical design; i.e., FIGS. 3A and 3B, provides that the beam planes are perpendicular, which warrants a three-dimensional, instead of a two-dimensional, single-plane design. The mechanical design of the HAPI instrument 106 may include beam frames (not shown), which have slots for optical component holders, optical-component holders, and an exterior outer casing (e.g., housing) 129 for support and which keep the beam frames and electronics in place and attach to the measurement platform (not shown), whether a drone or a static mounting post. Most of these structural elements, particularly the component holders, may be fabricated with a 3D printer to keep the weight of the HAPI instrument 106 sufficiently low that it can be carried by an inexpensive UAV, drone, or other aerospace vehicle 250.

Due to separate optical frames, each beam path (e.g., trigger-beam path 125 and hologram-beam path 130) can be assembled and aligned separately on a tabletop and then integrated into the outer casing (e.g., housing) 129 (shown in FIG. 2). Keeping the mounts (not shown) small helps to minimize the overall size of the HAPI instrument 106 and two types may be used: static mounts and kinematic mounts. Static mounts provide no adjustment parallel to the optical plane and no rotational adjustment of a component but do allow for perpendicular adjustment relative to the optical plane. Kinematic mounts are essentially static mounts with a separate nested mount that allows for the component to be rotated along all three axes; i.e., pitch, yaw, and roll. Due to their larger size, kinematic mounts are only used for the mirrors 102a, 102b, 103, 128 in the beam paths 125, 130 that are key to ensuring that the beams 110, 111 will overlap properly in the sensing region 135 and be centered on the face of the optical sensor 35.

The outer casing (e.g., housing) 129 may be printed in pieces and then assembled via screws to form the final structure of the HAPI instrument 106. While this adds to the complexity of the manufacturing of the HAPI instrument 106, this means that pieces of the outer casing 129 can be removed independently to provide access to the internal optics without having to disassemble the entire HAPI instrument 106. This is convenient for purposes such as realigning beams and cleaning optics between field trials. In an example, the three compartments of the system 100 (e.g., optics compartment 105, sensing compartment 115, and electronics compartment 140) may be fixed together using any suitable connecting member (not shown) such as carbon fiber strips, and the spacing between the adjacent compartments may be sealed using any suitable sealing mechanism (not shown) such as foil or tape for protection against stray light and dust. In an example, black foam disks (not shown) may be mounted around the circumference of the HAPI instrument 106 on the top and bottom ends of the sensing region 135 to serve as a sunshade.

Figure 7A:
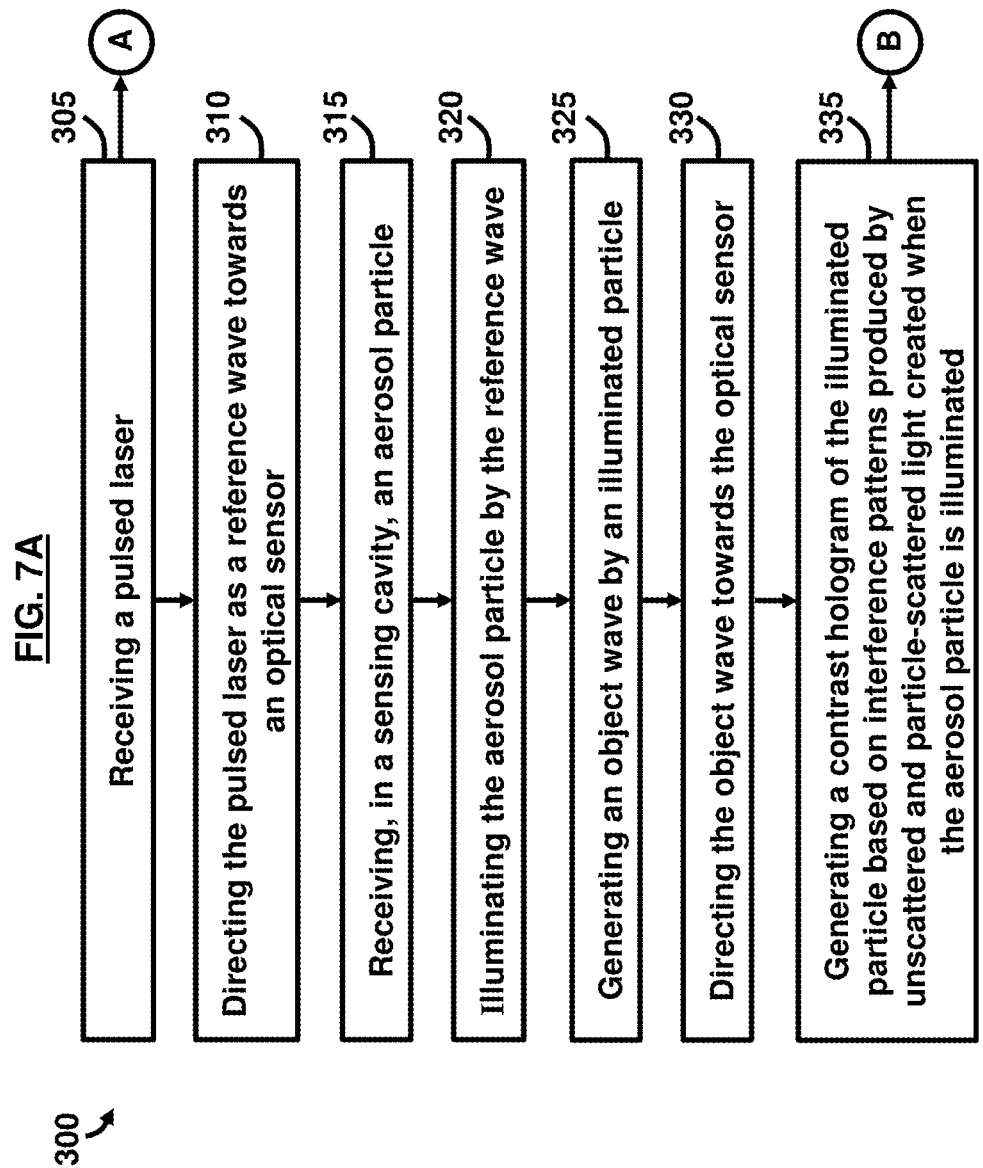
FIG. 7A is a flow diagram illustrating a method of generating a contrast hologram, according to an embodiment herein.
Figure 7B:
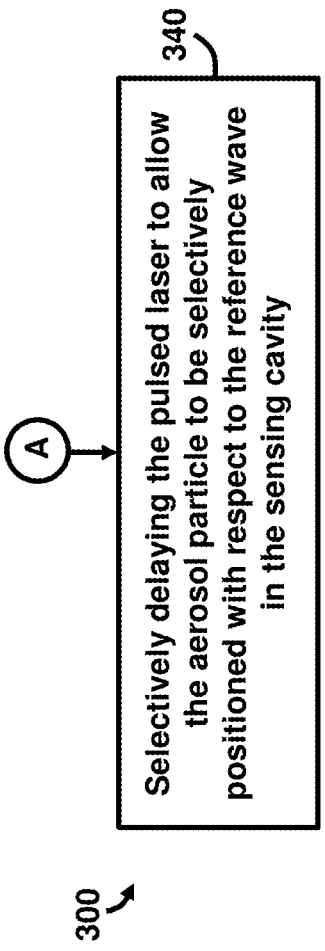
FIG. 7B is a flow diagram illustrating a method of selectively delaying a pulsed laser, according to an embodiment herein.
Figure 7C:
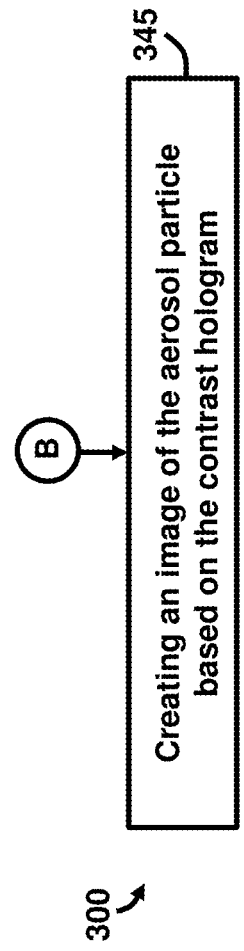
FIG. 7C is a flow diagram illustrating a method of creating an image of an aerosol particle, according to an embodiment herein.
Figure 8B:
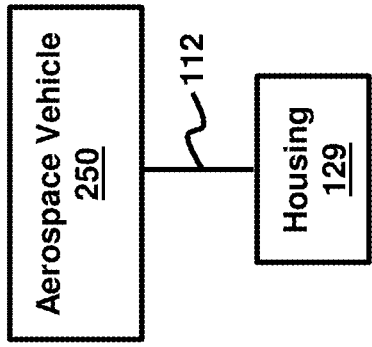
FIG. 8B is a system block diagram illustrating the housing of FIG. 2 connected to an aerospace vehicle, according to an embodiment herein.
Figure 8D:
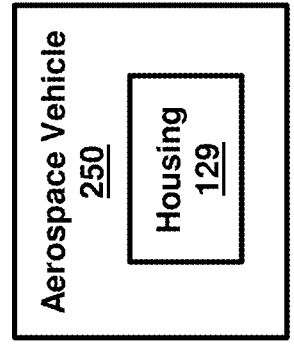
FIG. 8D is a system block diagram illustrating the housing of FIG. 2 integrated with an aerospace vehicle, according to an embodiment herein.
Figure 8A:
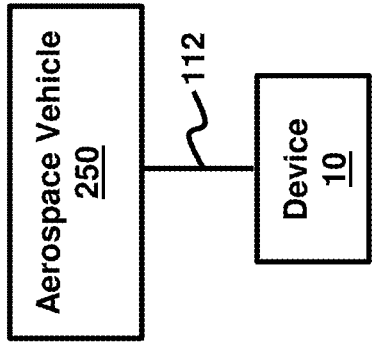
FIG. 8A is a system block diagram illustrating the device of FIG. 1A connected to an aerospace vehicle, according to an embodiment herein.
Figure 8C:
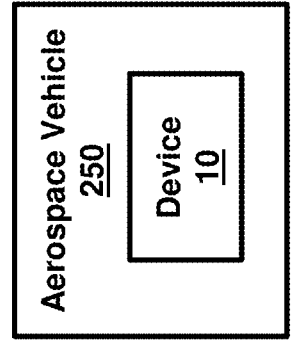
FIG. 8C is a system block diagram illustrating the device of FIG. 1A integrated with an aerospace vehicle, according to an embodiment herein.

FIGS. 7A through 7C, with reference to FIGS. 1A through 6H, are flow diagrams illustrating a method 300 of generating a contrast hologram 70 in a portable device (e.g., device 10 or opto-electric system 100). As shown in FIG. 7A, the method 300 comprises receiving (305) a pulsed laser 25 from a laser source 11; directing (310) the pulsed laser 25 as a reference wave 30 towards an optical sensor 35, which may be configured as a CCD sensor, CMOS device, or an array of opto-electronic elements; receiving (315), in a sensing cavity (e.g., open cavity 40), an aerosol particle 50; illuminating (320) the aerosol particle 50 by the reference wave 30; generating (325) an object wave 55 by an illuminated particle 50; directing (330) the object wave 55 towards the optical sensor 35; and generating (335) a contrast hologram 70 of the illuminated particle 50 based on interference patterns 85 produced by unscattered and particle-scattered light 90 created when the aerosol particle 50 is illuminated.

As shown in FIG. 7B, the method 300 may comprise selectively delaying (340) the pulsed laser 25 to allow the aerosol particle 50 to be selectively positioned with respect to the reference wave 30 in the sensing cavity (e.g., open cavity 40). As shown in FIG. 7C, the method 300 may comprise creating (345), using a processor 65, an image 75 of the aerosol particle 50 based on the contrast hologram 70. In an example, the image 75 may be created based on the aerosol particle 50 being approximately larger than five micrometers in size. With respect to data processing, images 75 are reconstructed from the contrast holograms 70, $I^{con}$, following scalar diffraction theory as described by. Generally, the hologram 70 is viewed as a transmission diffraction grating 95 illuminated by a plane wave. The Rayleigh-Sommerfeld solution to the scalar Helmholtz wave equation provides a description for the diffracted light amplitude, K. Again, referring to FIG. 1B, if the particle-sensor separation d is much greater than $\lambda_g$, the Fresnel approximation simplifies the solution to:

$$K(x,y,z) = \iint_{S_{holo}} I^{con}(x',y') h(x,x',y,y',z) dx' dy', \quad (1)$$

where h is the impulse response function of free space, $$h(x, x', y, y', z) = \frac{e^{\frac{2\pi i z}{\lambda_g}}}{i \lambda_g z} \exp\left\{ \frac{i\pi}{\lambda_g z}[(x-x')^2 + (y-y')^2] \right\}. \quad (2)$$

In Eq. (1), $S_{holo}$ is the hologram plane, i.e., the sensor, and evaluating $|K|^2$ yields a gray-scale silhouette image of the particle in the $S_{image}$ plane by systematically adjusting the parameter z to bring the image into focus. Eq. (1) is a convolution integral of the hologram with the response function as the kernel. Eq. (1) can be efficiently evaluated, e.g., using computational software or through use of fast Fourier transforms with comparable efficiency. Once a focus distance z is found, the unfocused twin image is removed. The process involves first forming a binarized mask from the focused image in $S_{image}$ backpropagating the mask to $S_{holo}$ via Eq. (1), and then subtracting the resulting complex-valued amplitude from $I^{con}$. This creates a new hologram that is again used in Eq. (1) to produce an updated image in $S_{image}$. Finally, the process is iterated until the effects of the twin image vanish, which usually occurs in approximately twenty iterations.

While the image reconstruction procedure above produces high quality images, many holograms are typically recorded in a given field trial and applying this procedure to the recorded data would require a prohibitively large amount of time. Thus, the hologram data from a field trial may be preprocessed with a fast image-reconstruction toolkit to identify the holograms most likely to yield quality particle images. The image reconstructions in this preprocessing stage may be performed with a Graphics Processing Unit (GPU) algorithm. Given the large sensing volume, the work is performed in two phases. First, the algorithm reconstructs images throughout the full volume in coarse depth steps along the z-axis wherein particles are detected with an autofocus method. For each particle detected, a separate series of reconstructions are run in fine depth steps to produce accurate values for the focus distances z of the particles in the full sensing region 135. Calibration of the length scales in the reconstructed images is achieved by measuring holograms of a 245 µm diameter optical fiber at different locations along the z-axis in the sensing region 135.

The device 10, opto-electric system 100, and method 300 provided by the embodiments herein are well-suited for field research, according to an example. The optical design permits a large sensing volume where hologram recording events may be triggered regardless of the direction particles that enter the instrument. This is important as environmental conditions like the air flow direction can hamper the aerosol investigations in other instruments. In addition, the design realizes a low size, weight, and power (SWaP) that enables its operation from inexpensive commercial UAVs 250. For example, as shown in the system block diagrams of FIGS. 8A and 8B, with reference to FIGS. 1A through 7C, the device 10 or housing 129 may be attached to an aerospace vehicle such as a UAV 250 using a tether 112. Moreover, as shown in the system block diagrams of FIGS. 8C and 8D, with reference to FIGS. 1A through 8B, the device 10 or housing 129 may be integrated with an aerospace vehicle such as a UAV 250.

The embodiments herein provide a technique that can provide morphological properties of aerosol particles in situ using digital holography and may be mobile by connecting the device 10 to a UAV 250, for example. Holography provides distinct advantages over imaging techniques in that there is no set focal plane. A holographic image 75 is brought into focus during processing, and multiple aerosol particles 50 can be imaged simultaneously in a single hologram. The images 75 may be obtained post-processing or in real time in the device 10 or remotely. Accordingly, the embodiments herein provide a technique of determining the spread of aerosols particles 50 over an area and tracking them in real time. Such a technique can be valuable for tracking both natural and manmade aerosols, like smoke, volcanic ash, pollutants, or even biological agents.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:
1. A device comprising:
a filter that enhances a beam profile of a received pulsed laser;
a first optical element to direct the pulsed laser as a reference wave towards an optical sensor;
optics configured to shape a beam from another laser into a collimated, hollow, annular trigger beam, wherein the reference wave is coaxial with and contained within the collimated, hollow, annular trigger beam;

an open cavity positioned between the first optical element and the optical sensor, wherein the open cavity receives an aerosol particle, wherein the reference wave illuminates the aerosol particle, and wherein an illuminated particle generates and directs an object wave towards the optical sensor;

a pixel array connected to the optical sensor, wherein the pixel array receives the reference wave and the object wave, and wherein the optical sensor creates a contrast hologram comprising an interference pattern of the illuminated particle which is the result of interference of the reference and object waves; and a processor that, in response to the trigger beam interacting with and detecting a particle, creates an image of the illuminated particle based on the contrast hologram.

2. The device of claim 1, wherein the aerosol particle flows in the open cavity in a direction substantially transverse to the reference wave and from any direction in a plane perpendicular to a propagation direction of the reference wave.

3. The device of claim 1, comprising a second optical element to direct the pulsed laser from the filter.

4. The device of claim 1, wherein the optical sensor comprises any of a charge coupled device (CCD), a complementary metal-oxide-semiconductor (CMOS) device, and an array of opto-electronic elements.

5. The device of claim 1, wherein the optical sensor detects the interference pattern produced by unscattered and particle-scattered light constituting the object wave.

6. The device of claim 1, wherein the contrast hologram comprises a transmission diffraction grating in a sensor plane to produce a diffracted light-field in an imaging plane.

7. The device of claim 1, wherein the optics comprises a pair of axicon lens.

8. The device of claim 1, further comprising a window in the sensing region that traps light rays scattered by the particle that interacts with the trigger beam, and wherein the window comprises a scattering coating causing the light rays to scatter into the window and become partially trapped therein by total internal reflection, and an opening to direct a portion of the scattered trigger beam to a trigger sensor.

9. An opto-electric system comprising:
an optics compartment that shapes, combines, and redirects a pair of laser beams;
a sensing compartment operatively connected to the optics compartment, wherein the sensing compartment comprises:
  a pair of laser sources that generate the pair of laser beams that are directed to the optics compartment, wherein a first laser beam of the pair of laser beams follows a trigger-beam path, and wherein a second laser beam of the pair of laser beams follows a hologram-beam path providing a reference wave, wherein the second laser beam is coaxial with and contained within the first laser beam;
  a sensing region containing a particle, wherein the sensing region receives the redirected pair of laser beams causing the particle to be illuminated by the reference wave and become an illuminated particle and producing an object wave;
  an optical sensor that detects the illuminated particle and creates a contrast hologram comprising an interference pattern of the illuminated particle which is the result of interference of the reference and the object waves; and an electronics compartment operatively connected to the sensing compartment, wherein the electronics compartment comprises:
  a signal generator that generates a beam trigger signal upon the particle becoming illuminated;
  a control system that receives the beam trigger signal, and creates a delay in a pulse of the second laser beam; and
  a memory device that stores the contrast hologram of the illuminated particle; and a processor that creates an image of the illuminated particle based on the contrast hologram.

10. The opto-electric system of claim 9, wherein the first laser beam comprises a first wavelength, wherein the second laser beam comprises a second wavelength different from the first wavelength.

11. The opto-electric system of claim 10, wherein a pulse of the second laser beam is delayed by the beam trigger signal, and wherein the second laser beam illuminates the particle.

12. The opto-electric system of claim 10, wherein the contrast hologram is recorded from the second laser beam.

13. The opto-electric system of claim 9, wherein the optics compartment redirects the pair of laser beams to propagate along a shared coaxial beam axis.

14. The opto-electric system of claim 9, wherein the sensing compartment comprises a photomultiplier tube that receives a scattered portion of the first laser beam that indicates a presence of the particle in the sensing region, which causes the optical sensor to generate the beam trigger signal to cause the control system to create the delay in the pulse of the second laser beam.

15. The opto-electric system of claim 14, wherein the sensing compartment comprises a window in the sensing region that traps light rays scattered by the particle that interacts with the first laser beam, and wherein the window comprises a diffuse scattering coating causing the light rays to scatter into the window and become partially trapped therein by total internal reflection.

16. The opto-electric system of claim 15, wherein the diffuse scattering coating comprises an opening to direct a portion of the light rays to the photomultiplier tube.

17. The opto-electric system of claim 15, wherein the sensing compartment comprises a plurality of filters that filter ambient light and stray laser light from saturating the optical sensor.

18. The opto-electric system of claim 9, wherein the particle that triggers the beam trigger signal is approximately 10 μm and larger.

19. The opto-electric system of claim 9, comprising:
a housing containing the optics compartment, the sensing compartment, and the electronics compartment; and
an aerospace vehicle to portably transport the housing for imaging the particle.

20. A method of generating a contrast hologram in the device of claim 1, the method comprising:
receiving a pulsed laser;
directing the pulsed laser as a reference wave towards an optical sensor;
receiving, in a sensing cavity, an aerosol particle;
illuminating the aerosol particle by the reference wave;
generating an object wave by an illuminated particle;
directing the object wave towards the optical sensor; and
generating a contrast hologram of the illuminated particle based on interference patterns produced by unscattered and particle-scattered light created when the aerosol particle is illuminated.

21. The method of claim 20, comprising selectively delaying the pulsed laser to allow the aerosol particle to be selectively positioned with respect to the reference wave in the sensing cavity.

22. The method of claim 20, comprising creating an image of the aerosol particle based on the contrast hologram.

* * * * *